(12) United States Patent
Hwang et al.

(10) Patent No.: US 12,206,104 B2
(45) Date of Patent: Jan. 21, 2025

(54) POSITIVE ELECTRODE ACTIVE MATERIAL FOR LITHIUM SECONDARY BATTERY AND METHOD OF PREPARING THE SAME

(71) Applicant: LG Chem, Ltd., Seoul (KR)

(72) Inventors: Byung Hyun Hwang, Daejeon (KR); Song Yi Yang, Daejeon (KR); Seong Bae Kim, Daejeon (KR); Woo Hyun Kim, Daejeon (KR); Sun Sik Shin, Daejeon (KR); Eun Hee Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 702 days.

(21) Appl. No.: 17/294,542

(22) PCT Filed: Nov. 19, 2019

(86) PCT No.: PCT/KR2019/015860
§ 371 (c)(1),
(2) Date: May 17, 2021

(87) PCT Pub. No.: WO2020/106024
PCT Pub. Date: May 28, 2020

(65) Prior Publication Data
US 2021/0408537 A1    Dec. 30, 2021

(30) Foreign Application Priority Data

Nov. 20, 2018 (KR) .................. 10-2018-0143804
Nov. 18, 2019 (KR) .................. 10-2019-0147928

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
None
See application file for complete search history.

(56) References Cited

U.S. PATENT DOCUMENTS

| 11,081,694 B2 | 8/2021 | Park et al. |
| 2010/0243952 A1* | 9/2010 | Kumada ............... H01M 4/505 |
| | | 252/182.1 |

(Continued)

FOREIGN PATENT DOCUMENTS

| CN | 103633308 A | 3/2014 |
| CN | 105375010 A | 3/2016 |

(Continued)

OTHER PUBLICATIONS

Dong, J., He, H., Zhang, D. et al. Boron improved electrochemical performance of LiNi0.8Co0.1Mn0.1O2 by enhancing the crystal growth with increased lattice ordering. J Mater Sci: Mater Electron 30, 18200-18210 (2019). https://doi.org/10.1007/s10854-019-02174-3 (Year: 2019).*

(Continued)

*Primary Examiner* — Scott J. Chmielecki
(74) *Attorney, Agent, or Firm* — Lerner David LLP

(57) ABSTRACT

A positive electrode active material is provided, including a lithium transition metal oxide containing nickel (Ni), cobalt (Co), and manganese (Mn), wherein the lithium transition metal oxide has 60 mol % or more nickel (Ni) with respect the total number of moles of transition metal except lithium, and is doped with at least any one doping element selected from the group consisting of B, Zr, Mg, Ti, Sr, W, and Al. The positive electrode active material has an average par- (Continued)

ticle diameter ($D_{50}$) of 4 μm to 10 μm after rolling at a rolling density of 3.0 g/cm³ to 3.3 g/cm³ and has the form of a single particle. A method of preparing the positive electrode active material, a positive electrode including the positive electrode active material, and a lithium secondary battery are also provided.

7 Claims, 6 Drawing Sheets

(51) Int. Cl.
*H01M 4/02* (2006.01)
*H01M 4/505* (2010.01)
*H01M 10/0525* (2010.01)

(52) U.S. Cl.
CPC ...... *C01P 2002/52* (2013.01); *C01P 2004/03* (2013.01); *C01P 2004/61* (2013.01); *C01P 2006/40* (2013.01); *H01M 2004/028* (2013.01); *H01M 10/0525* (2013.01)

(56) References Cited

U.S. PATENT DOCUMENTS

| | | |
|---|---|---|
| 2011/0291044 A1 | 12/2011 | Wang et al. |
| 2015/0147655 A1 | 5/2015 | Park et al. |
| 2015/0228973 A1 | 8/2015 | Won et al. |
| 2016/0211517 A1 | 7/2016 | Beck et al. |
| 2017/0288222 A1* | 10/2017 | Kobayashi ........... C01G 53/006 |
| 2018/0261842 A1* | 9/2018 | Park ...................... H01M 4/131 |
| 2018/0366723 A1 | 12/2018 | Shen et al. |
| 2019/0115596 A1 | 4/2019 | Kajiyama et al. |
| 2020/0280058 A1 | 9/2020 | Shen et al. |
| 2021/0135216 A1* | 5/2021 | Lee ....................... H01M 4/364 |
| 2021/0313573 A1 | 10/2021 | Park et al. |
| 2023/0369584 A1* | 11/2023 | Li ....................... H01M 10/052 |

FOREIGN PATENT DOCUMENTS

| | | |
|---|---|---|
| CN | 108140829 A | 6/2018 |
| CN | 108306014 A | 7/2018 |
| CN | 105375010 B | 9/2018 |
| EP | 3041071 A1 | 7/2016 |
| EP | 3349276 A2 | 7/2018 |
| EP | 3386015 A1 | 10/2018 |
| JP | 2001076724 A | 3/2001 |
| JP | 2017188428 A | 10/2017 |
| JP | 2018532236 A | 11/2018 |
| KR | 100734225 B1 | 7/2007 |
| KR | 20150093539 A | 8/2015 |
| KR | 101651336 B1 | 8/2016 |
| KR | 20170009557 A | 1/2017 |
| KR | 101731473 B1 | 4/2017 |
| KR | 20170063408 A | 6/2017 |
| KR | 20170100534 A | 9/2017 |
| KR | 20180084673 A | 7/2018 |
| KR | 20180093079 A | 8/2018 |
| WO | 2017095153 A1 | 6/2017 |

OTHER PUBLICATIONS

Zhao et al., Structure Evolution from Layered to Spinel during Synthetic Control and Cycling Process of Fe-Containing Li-Rich Cathode Materials for Lithium-Ion Batteries, ACS Omega 2017, 2, 9, 5601-5610 (Year: 2017).*

International Search Report for Application No. PCT/KR2019/015860, mailing dated Feb. 26, 2020, 2 pages.

Search Report for European Application No. 19886156.9 dated Nov. 22, 2021. 2 pgs.

Search Report dated Jan. 30, 2024 from the Office Action for Chinese Application No. 201980076176.6 issued Feb. 1, 2024, 2 pages.

* cited by examiner

POSITIVE ELECTRODE ACTIVE MATERIAL FOR LITHIUM SECONDARY BATTERY AND METHOD OF PREPARING THE SAME

CROSS-REFERENCE TO RELATED APPLICATIONS

The present application is a national stage entry under 35 U.S.C. § 371 of International Application No. PCT/KR2019/015860 filed on Nov. 19, 2019, which claims priority to Korean Patent Application Nos. 10-2018-0143804, filed on Nov. 20, 2018, and 10-2019-0147928, filed on Nov. 18, 2019, in the Korean Intellectual Property Office, the disclosure of which are incorporated herein in their entirety by reference.

TECHNICAL FIELD

The present invention relates to a positive electrode active material for a lithium secondary battery, a method of preparing the same, a positive electrode for a lithium secondary battery including the positive electrode active material, and a lithium secondary battery.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, $LiCoO_2$ has very poor thermal properties due to an unstable crystal structure caused by delithiation, and since $LiCoO_2$ is expensive, there is a limitation in using a large amount of $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing $LiCoO_2$. Among these materials, research and development of the lithium nickel composite metal oxides, in which a large capacity battery may be easily achieved due to a high reversible capacity of about 200 mAh/g, have been more actively conducted. However, $LiNiO_2$ has limitations in that $LiNiO_2$ has poorer thermal stability than $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of $LiNiO_2$, a lithium nickel cobalt manganese oxide, in which a portion of nickel (Ni) is substituted with manganese (Mn) or cobalt (Co), has been developed.

However, the lithium nickel cobalt manganese oxide has low particle strength, structural stability, and capacity, and particularly when the amount of nickel is increased to 60 mol % or more to increase capacity characteristics, there is a limitation in that a large amount of lithium by-products such as LiOH and $Li_2CO_3$ are generated on the surface due to the tendency of nickel in the lithium nickel cobalt metal oxide to be maintained as $Ni^{2+}$. As such, when the lithium nickel cobalt metal oxide having a large amount of lithium by-products on the surface is used, a swelling phenomenon may be caused in a lithium secondary battery due to reaction with an electrolyte injected into the lithium secondary battery, and thus a secondary battery including the same does not sufficiently exhibit battery performance.

Accordingly, there is a demand for development of a positive electrode active material that may be used to produce a secondary battery having high capacity, and improved lifetime and resistance characteristics by enhancing particle strength and structural stability.

DISCLOSURE OF THE INVENTION

Technical Problem

An aspect of the present invention provides a positive electrode active material having an average particle diameter ($D_{50}$) of 4 μm to 10 μm after rolling at a rolling density of 3.0 g/cm³ to 3.3 g/cm³, having a single particle form, doped with a specific doping element to obtain high capacity characteristics while having improved lifetime and resistance characteristics.

Another aspect of the present invention provides a method of preparing a positive electrode active material having an average particle diameter ($D_{50}$) of 4 μm to 10 μm after rolling at a rolling density of 3.0 g/cm³ to 3.3 g/cm³ in the form of a single particle without deterioration of electrochemical properties even when a conventional lithium transition metal oxide containing a large amount of nickel is calcined at a relatively lower temperature than the calcination temperature for preparing the lithium transition metal oxide in the form of a single particle by doping a specific doping element in the preparation of a positive electrode active material.

Another aspect of the present invention provides a positive electrode for a lithium secondary battery including the positive electrode active material.

Another aspect of the present invention provides a lithium secondary battery including the positive electrode for a lithium secondary battery.

Technical Solution

According to an aspect of the present invention, there is provided a positive electrode active material which is a lithium transition metal oxide containing nickel (Ni), cobalt (Co), and manganese (Mn), wherein the lithium transition metal oxide has 60 mol % or more of nickel (Ni) with respect the total number of moles of transition metal except lithium, and is doped with at least any one doping element selected from the group consisting of B, Zr, Mg, Ti, Sr, W, and Al, and the positive electrode active material has an average particle diameter ($D_{50}$) of 4 μm to 10 μm after rolling at a rolling density of 3.0 g/cm³ to 3.3 g/cm³ and has the form of a single particle.

According to another aspect of the present invention, there is provided a method of preparing a positive electrode active material including: preparing a transition metal hydroxide precursor containing 60 mol % or more of nickel (Ni) with respect the total number of moles of transition metal hydroxide including nickel (Ni), cobalt (Co), and manganese (Mn); mixing the transition metal hydroxide precursor with a doping element raw material-containing aqueous solution selected from the group consisting of B, Zr, Mg, Ti, Sr, W and Al and drying; and mixing a lithium raw material with the mixture and calcining at 810° C. or higher to prepare a lithium transition metal oxide in the form of a single particle.

According to another aspect of the present invention, there is provided a positive electrode for a lithium secondary battery including a positive electrode active material according to the present invention.

According to another aspect of the present invention, there is provided a lithium secondary battery including a positive electrode according to the present invention.

Advantageous Effects

According to the present invention, in the preparation of a positive electrode active material including a large amount of nickel, by doping with a specific doping element, even when calcining at a relatively low temperature than the temperature for preparing a conventional positive electrode active material in the form of a single particle, a positive electrode active material having a single particle form and an average particle diameter ($D_{50}$) of 4 μm to 10 μm after rolling at a rolling density of 3.0 g/cm$^3$ to 3.3 g/cm$^3$ may be prepared. Accordingly, without deterioration of electrochemical characteristics of the positive electrode active material due to high temperature calcination, a positive electrode active material having improved lifetime and resistance characteristics may be provided.

MODE FOR CARRYING OUT THE INVENTION

Figure 1:
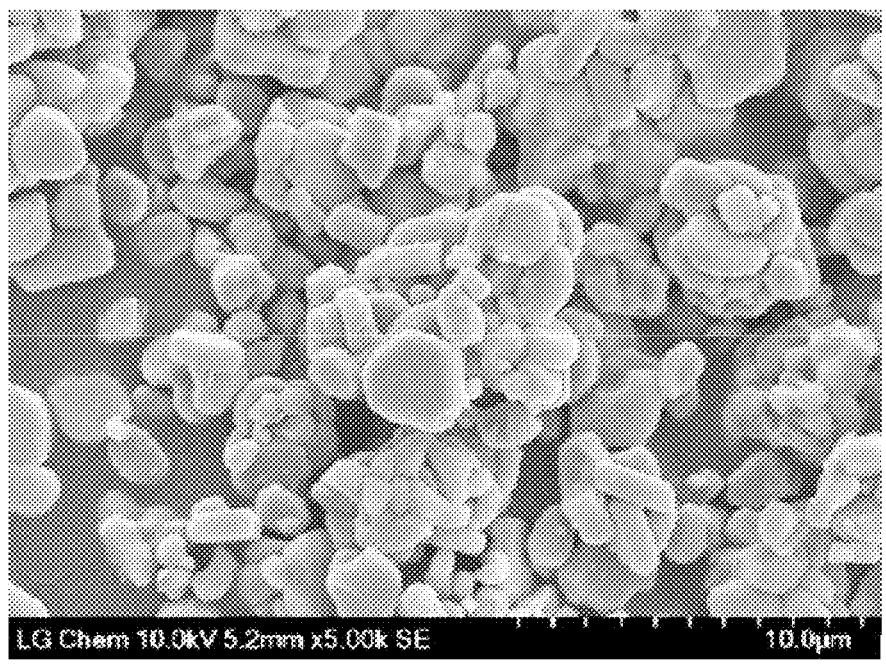
FIG. 1 is an SEM image of a positive electrode active material prepared in Example 1.

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

In the present specification, a 'particle' refers to a grain in micro scale, and when magnified and observed, it may be classified as a 'grain' having a crystal form of several tens of nano scale. When further magnified, it is seen that there is a separate area where atoms form a lattice structure in a regular direction, which is called 'crystallite', and the size of the particles observed in XRD is defined by the size of the crystallite. The crystallite size can be measured using the peak broadening of XRD data and quantitatively calculated using Scherrer Equation.

In the present specification, an average particle diameter ($D_{50}$) may be defined as a particle diameter corresponding to 50% of the volume cumulative amount in the particle diameter distribution curve of particles. The average particle diameter ($D_{50}$) may be measured using, for example, a laser diffraction method. In general, the laser diffraction method allows for measurement of a particle diameter from a submicron level to a few mm, and may obtain high repeatable and high resolution results.

Positive Electrode Active Material

Conventionally, in order to increase the capacity of a lithium secondary battery, a high nickel-content positive electrode active material including 60 mol % or more of nickel with respect to the total moles of transition metal except lithium was used. However, in this case, the excessive generation of lithium by-products on the surface of the positive electrode active material caused a swelling phenomenon of the secondary battery, and also had a limitation in that the stability of the positive electrode active material was inferior due to low particle strength. When a positive electrode active material in the form of a single particle was prepared by over-calcining a high nickel-content positive electrode active material in order to overcome the limitation, the stability was improved, but there were limitations such as deterioration of lifetime and resistance characteristics due to high temperature calcination.

In response, the inventors of the present invention conducted a thorough study to develop a high nickel-content positive electrode active material in the form of a single particle without deterioration of lifetime and resistance characteristics, and as a result, the inventors have found out and completed a method of preparing a positive electrode active material having a single particle form and also having improved lifetime and resistance characteristics even after calcination at a relatively low temperature than the temperature for preparing a positive electrode active material in the form of a single particle from a conventional high nickel-content positive electrode active material by doping a high nickel-content lithium transition metal oxide with a specific doping element.

A positive electrode active material according to the present invention is a lithium transition metal oxide including nickel (Ni), cobalt (Co), and manganese (Mn), wherein the lithium transition metal oxide has 60 mol % or more of nickel (Ni) with respect to the total moles of transition metal except lithium, and is doped with at least one doping element selected from the group consisting of B, Zr, Mg, Ti, Sr, W and Al, and the positive electrode active material has an average particle diameter ($D_{50}$) of 4 μm to 10 μm after rolling at a rolling density of 3.0 g/cm$^3$ to 3.3 g/cm$^3$ and has the form of a single particle.

A lithium transition metal oxide according to an embodiment of the present invention includes nickel (Ni), cobalt (Co), and manganese (Mn), and may be a high nickel-content (High-Ni), NCM-based lithium transition metal oxide having 60 mol % or more of nickel (Ni), more preferably 80 mol % or more, and most preferably 85 mol % to 90 mol % with respect to the total amount of transition metal.

As described above, when a lithium transition metal oxide containing 60 mol % or more, preferably 80 mol % or more of nickel with respect to the total number of moles of transition metal oxide except lithium is used for a battery, high capacity characteristics due to the high nickel-content may be obtained.

In addition, the lithium transition metal oxide having high nickel-content is doped with at least any one doping element selected from the group consisting of B, Zr, Mg, Ti, Sr, W and Al, most preferably B.

When the lithium transition metal oxide having high nickel-content is doped with at least any one doping element selected from the group consisting of B, Zr, Mg, Ti, Sr, W, and Al, the structural stability of a positive electrode active material is improved, and thus improving lifetime and resistance characteristics when applied to a battery. In particular, when including B as a doping element, the growth of the positive electrode active material crystal is promoted by B, and thus after preparing and disaggregating the positive electrode active material, even when rolling at a rolling density of 3.0 g/cm³ to 3.3, a positive electrode active material having a particle diameter ($D_{50}$) of 4 μm to 10 μm may be prepared. In addition, due to the tetrahedral crystal structure of B, a covalent bond between B and O is stronger than a covalent bond between transition metal and O. Accordingly, structural expansion is prevented during intercalation/deintercalation of lithium ions and an SEI layer is formed more stably, thereby reducing side reactions between the surface of the positive electrode active material and an electrolyte. Consequently, the specific surface area of the positive electrode active material is reduced, the particle strength is improved to prevent cracks of particles during rolling, and the amount of lithium by-products is decreased to reduce side reactions with the electrolyte, and thus a battery having improved lifetime, stability, and resistance characteristics may be provided when applied to a battery.

For example, the doping element may be included in an amount of 100 ppm to 4,000 ppm, preferably 500 ppm to 2,000 ppm, with respect to the total weight of the lithium transition metal oxide. When the doping element is included in the above range, lifetime and resistance characteristics may be further improved.

A positive electrode active material of the present invention is in the form of a single particle, that is, primary particles, rather than aggregated secondary particles. In the present invention, 'primary particles' means a primary structure of a single particle, and 'secondary particles' means aggregates, that is, a secondary structure in which primary particles are aggregated by physical or chemical bonding between the primary particles without the intentional aggregation or assembly process for the primary particles constituting the secondary particles.

In addition, the positive electrode active material of the present invention may have an average particle diameter ($D_{50}$) of 4 μm to 10 μm, preferably 4 μm to 6 μm, after rolling at a rolling density of 3.0 g/cm³ to 3.3 g/cm³. For example, the positive electrode active material is present in the form of secondary particles in which primary particles are aggregated in the process of mixing and calcining a positive electrode active material precursor and a lithium raw material and when this is disaggregated and rolled at a rolling density of 3.0 g/cm³ to 3.3 g/cm³, the aggregated positive electrode active material is broken around grains. In particular, when the positive electrode active material is doped with a specific doping element, for example, at least any one doping element selected from the group consisting of B, Zr, Mg, Ti, Sr, W and Al, most preferably B, as the doping element B is doped, the crystal size of the positive electrode active material increases, so that the average particle diameter ($D_{50}$) after rolling the positive electrode active material satisfies the above range. That is, according to the present invention, the crystal size of the positive electrode active material is increased by doping the doping element, and in this case, even when calcining at a temperature lower than the calcination temperature (e.g., 900° C. or higher) for conventionally forming a single particle, a positive electrode active material in the form of a single particle may be easily prepared, the particle strength of the prepared positive electrode active material increases to prevent cracks of particles during rolling, improve rolling density, reduce a specific surface area, and reduce lithium by-products, thereby reducing the amount of gas generated by side reactions with an electrolyte.

The crystallite size of the lithium transition metal oxide may be 170 nm or more, preferably 180 nm to 200 nm. When the crystallite size of the lithium transition metal oxide satisfies the above range, the lithium transition metal oxide may have a single particle form. For example, when the crystallite size of the positive electrode active material exceeds 200 nm, the positive electrode active material has a single particle form, but the increase of the crystallite size may deteriorate efficiency characteristics. In addition, when the crystallite size of the positive electrode active material is less than 170 nm, the lithium transition metal oxide may not have a single particle form but have a secondary particle form in which primary particles are aggregated. As the positive electrode active material has a single particle form, the particle strength increases, and thus, the occurrence of the positive electrode active material cracking may be reduced during charging and discharging of a battery including the same, thereby improving stability of the positive electrode active material.

More specifically, the lithium transition metal oxide according to an embodiment of the present invention may be represented by Formula 1 below.

    [Formula 1]

In Formula 1 above, 0≤a≤0.5, 0.6≤x<1, 0<y≤0.4, 0<z≤0.4, and 0<w≤0.04, M¹ is at least any one selected from the group consisting of B, Zr, Mg, Ti, Sr, W and Al, more preferably 0≤a≤0.5, 0.8≤x<1, 0<y≤0.2, 0<z≤0.2, and 0<w≤0.01, and M¹ is B.

As such, the high nickel-content (High-Ni), NCM-based positive electrode active material having a single particle form and 60 mol % or more of nickel (Ni), and doped with a specific doping element is capable of achieving high capacity and excellent stability at the same time. Specifically, the specific surface area is reduced, the particle strength is improved to prevent cracks of particles during rolling, and the amount of lithium by-products is decreased to reduce side reactions with an electrolyte. In addition, the high nickel-content (High-Ni), NCM-based positive electrode active material of the present invention secures excellent structural stability and chemical stability, so that the amount of gas generated when driving cells may be reduced and thermal stability may be obtained.

Method of Preparing Positive Electrode Active Material

Next, a method of preparing a positive electrode active material according to the present invention will be described.

To be specific, a method of preparing a positive electrode active material according to the present invention which includes: preparing a transition metal hydroxide precursor containing 60 mol % or more of nickel with respect to the total number of moles of transition metal hydroxide having nickel (Ni), cobalt (Co), and manganese (Mn); mixing the transition metal hydroxide precursor with a doping element raw material-containing aqueous solution selected from the group consisting of B, Zr, Mg, Ti, Sr, W and Al and drying; and mixing a lithium raw material with the mixture and calcining at 810° C. or higher to prepare a lithium transition metal oxide in the form of a single particle.

In more detail, first, a transition metal precursor containing 60 mol % or more of nickel is prepared with respect to the total number of moles of the transition metal hydroxide having nickel (Ni), cobalt (Co), and manganese (Mn).

The transition metal precursor may be used by purchasing a commercially available precursor for a positive electrode active material, or may be prepared according to a method of preparing a precursor for a positive electrode active material, which is well known in the art.

The precursor may be prepared by adding an ammonium cation-containing complex forming agent and a basic compound to a transition metal solution including a nickel-containing raw material, a cobalt-containing raw material, and a manganese-containing raw material and performing coprecipitation reaction.

The nickel-containing raw material may be, for example, nickel-containing acetate, nitrate, sulfate, halide, sulfide, hydroxide, oxide, or oxyhydroxide, and specifically, $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, fatty acid nickel salt, nickel halide or a combination thereof, but is not limited thereto.

The cobalt-containing raw material may be cobalt-containing acetate, nitrate, sulfate, halide, sulfide, hydroxide, oxide or oxyhydroxide, etc., specifically, $Co(OH)_2$, CoOOH, $Co(OCOCH_3)_2 \cdot 4H_2O$, $Co(NO_3)_2 \cdot 6H_2O$, $CoSO_4$, $Co(SO_4)_2 \cdot 7H_2O$, or a combination thereof, but is not limited thereto.

The manganese-containing raw material may be, for example, manganese-containing acetate, nitrate, sulfate, halide, sulfide, hydroxide, oxide, oxyhydroxide, or a combination thereof, specifically, manganese oxide such as $Mn_2O_3$, $MnO_2$, and $Mn_3O_4$; manganese salt such as $MnCO_3$, $Mn(NO_3)_2$, $MnSO_4$, manganese acetate, dicarboxylic acid manganese salt, manganese citrate, and fatty acid manganese salt; oxy manganese hydroxide, manganese chloride, or a combination thereof, but is not limited thereto.

The transition metal solution may be prepared by adding a nickel-containing raw material, a cobalt-containing raw material, and a manganese-containing raw material to a solvent, specifically, water or a mixed solvent of an organic solvent (e.g., alcohol, etc.) that may be uniformly mixed with water, or may be prepared by mixing an aqueous solution of a nickel-containing raw material, an aqueous solution of a cobalt-containing raw material, and a manganese-containing raw material.

The ammonium cation-containing complex forming agent may be, for example, $NH_4OH$, $(NH_4)_2SO_4$, $NH_4NO_3$, $NH_4Cl$, $CH_3COONH_4$, $NH_4CO_3$, or a combination thereof, but is not limited thereto. Meanwhile, the ammonium cation-containing complex forming agent may be used in the form of an aqueous solution, and in this case, a solvent may be water or a mixture of an organic solvent (specifically, alcohol, etc.), which may be uniformly mixed with water, and water.

The basic compound may be a hydroxide of an alkali metal or an alkaline earth metal such as NaOH, KOH, or $Ca(OH)_2$, a hydrate thereof, or a combination thereof. The basic compound may also be used in the form of an aqueous solution. In this case, a solvent may be water or a mixture of an organic solvent (specifically, alcohol, etc.), which can be uniformly mixed with water, and water.

The basic compound is added to adjust the pH of a reaction solution, and the pH of the metal solution may be added in an amount of 11 to 13.

Meanwhile, the coprecipitation reaction may be performed at a temperature of 40° C. to 70° C. in an inert atmosphere such as nitrogen or argon.

By the above process, particles of nickel-cobalt-manganese hydroxide are generated and precipitated in the reaction solution. The concentration of the nickel-containing raw material, cobalt-containing raw material, and manganese-containing raw material may be adjusted to produce a precursor having 60 mol % or more of nickel (Ni) with respect to the total amount of transition metal. The precipitated nickel-cobalt-manganese hydroxide particles are separated according to a conventional method and dried to obtain a nickel-cobalt-manganese precursor.

Subsequently, the doping element raw material-containing aqueous solution and the transition metal hydroxide precursor are mixed and dried.

As a doping element raw material, sulfate, nitrate, acetate, halide, hydroxide, or oxyhydroxide including at least any one doping element selected from the group consisting of B, Zr, Mg, Ti, Sr, W, and Al may be used, and if it is dissolvable in a solvent such as water, it may be used without particular limitation. Preferably, the doping element raw material may be sulfate, nitrate, acetate, halide, hydroxide, or oxyhydroxide including B, more preferably include at least any one selected from the group consisting of boric acid, boron trioxide, boron carbide, boron trifluoride, and monofluorine.

As described above, when the doping element is doped by a wet process in which a doping element raw material is dissolved in an aqueous solution and mixed with the transition metal hydroxide precursor, the doping element may be uniformly doped throughout the positive electrode active material. For example, when the doping element raw material is doped to the transition metal hydroxide precursor by using a dry method, the doping element may be partially aggregated and doped, so that the improvement of lifetime and resistance characteristics may be deteriorated by the wet method when applied to a battery.

For example, the doping element raw material may be dissolved in an aqueous solution to a concentration of 0.1M to 0.5M, preferably 0.2M to 0.4M. For example, when exceeding the above range, the probability of reacting lithium with the doping element is increased, thereby reducing the reactivity of a precursor and lithium, in which case the structural integrity of the positive electrode active material is reduced, specific capacity, efficiency, and lifetime characteristics may be reduced.

For example, the positive electrode active material may be provided by mixing a doping element M raw material-containing aqueous solution to make the amount of the doping element become 100 ppm to 4,000 ppm, preferably 500 ppm to 2,000 ppm with respect to the total parts by weight of the lithium transition metal oxide.

In particular, when the transition metal hydroxide precursor is doped with B as a doping element, even when the calcination temperature is lowered in the preparation of a positive electrode active material, growth of the positive electrode active material crystallite is promoted by B, so that a positive electrode active material in the form of a single particle may be prepared. In general, when a high Ni-content transition metal hydroxide precursor having 60 mol % or more of Ni with respect to the total number of moles of transition metal and a lithium raw material (e.g., LiOH·H$_2$O) are mixed and calcined, reaction with the transition metal hydroxide precursor starts from the point where lithium is melted and in this case, since the melting point of LiOH·H$_2$O is about 400° C., the transition metal hydroxide precursor and lithium react at 400° C. or higher. However, since B may react with Li at about 150° C., B and Li react at 150° C., and B also serves as a catalyst when Li and the transition metal hydroxide precursor react at 450° C. or higher. Accordingly, the reaction temperature of Li and the transition metal hydroxide precursor is lowered, and when B is applied, even when calcination is performed at a temperature lower than a calcination temperature of a mixture of a transition metal hydroxide precursor having high nickel-content and a lithium raw material, a positive electrode active material in the form of a single particle may be prepared. Therefore, the deterioration of electrochemical characteristics conventionally caused by high temperature calcination is prevented to prepare a high nickel-content positive electrode active material in the form of a single particle, having improved lifetime and resistance characteristics.

The drying is for drying the aqueous solution in which the doping element raw material is dissolved, and may be used without particular limitation as long as the method can dry the solvent without causing chemical change in a battery. For example, methods such as spray drying, drying using a rotary evaporator, vacuum drying or natural drying may be used.

Next, a lithium raw material is mixed with the mixture of the doping element raw material-containing aqueous solution and the transition metal hydroxide precursor and calcined at 810° C. or higher to prepare a positive electrode active material in the form of a single particle.

The lithium raw material may be used without particular limitation as long as it is a compound including a lithium source, but preferably, at least one selected from the group consisting of lithium carbonate (Li$_2$CO$_3$), lithium hydroxide (LiOH), LiNO$_3$, CH$_3$COOLi, and Li$_2$(COO)$_2$ may be used.

The calcination may be performed in an oxygen atmosphere at 810° C. or higher, preferably 810° C. to 880° C., preferably 810° C. to 850° C., more preferably 810° C. to 830° C. for 12 hours to 24 hours. As described above, the positive electrode active material may be recrystallized and formed into a single particle by calcining for 12 to 24 hours at 810° C. or higher. For example, when the calcination process is performed at a temperature of lower than 810° C., the positive electrode active material is not recrystallized, so that the positive electrode active material may be formed into secondary particles in which primary particles are aggregated and in this case, the particle strength of the positive electrode active material is inferior, and thus stability of a secondary battery in which the positive electrode active material is applied may be reduced. In addition, when the calcination process is performed at a temperature of higher than 880° C., the positive electrode active material is recrystallized to form a single particle, whereas in the case of a transition metal hydroxide precursor having high Ni-content, mixing with lithium and performing high temperature calcination lead to the phase transition from Ni$^{3+}$ to Ni$^{2+}$ to be substituted into Li site, so that when applied to a battery, capacity, lifetime and resistance characteristics may become inferior.

Next, in order to remove lithium by-products present on the surface of the lithium transition metal oxide, a process of washing the lithium transition metal oxide may be further performed.

Lithium transition metal oxides having high nickel-content are structurally less stable than lithium transition metal oxides having low nickel-content, thereby generating more lithium by-products such as unreacted lithium hydroxide or lithium carbonate in the preparing process. When a large amount of lithium by-products are present in a positive electrode active material, the lithium by-products and electrolytes react to generate gas and swelling, causing significant deterioration of high temperature stability. Therefore, a washing process to remove the lithium by-products from the lithium transition metal oxide having high nickel-content may be further performed.

The washing process may be performed, for example, by adding a lithium transition metal oxide to ultrapure water and stirring. In this case, the washing temperature may be ° C. or lower, preferably 10° C. to 20° C., and the washing time may be about 10 minutes to 1 hour. When the washing temperature and washing time satisfy the above range, lithium by-products may be effectively removed.

Positive Electrode

Next, a positive electrode for a lithium secondary battery including a positive electrode active material according to the present invention is provided.

Specifically, the positive electrode for a secondary battery includes a positive electrode collector and a positive electrode active material layer formed on the positive electrode collector, wherein the positive electrode active material layer includes a positive electrode active material according to the present invention.

In this case, since the positive electrode active material is the same as described above, a detailed description will be omitted, and hereinafter, only the remaining configurations will be described below.

The positive electrode collector is not particularly limited as long as it has conductivity without causing chemical changes in a battery, and, for example, stainless steel, aluminum, nickel, titanium, fired carbon, or aluminum or stainless steel that is surface-treated with carbon, nickel, titanium, silver, etc. may be used. In addition, the positive electrode collector may typically have a thickness of 3 μm to 500 μm, and microscopic irregularities may be formed on the surface of the collector to improve the adhesion of the positive electrode active material. The positive electrode collector, for example, may be used in various forms such as a film, a sheet, a foil, a net, a porous body, a foam body, and a non-woven fabric body.

The positive electrode active material layer may include a conductive agent, and selectively include a binder.

In this case, the positive electrode active material may be included in an amount of 80 wt % to 99 wt %, more specifically, 85 wt % to 98.5 wt % with respect to the total weight of the positive electrode active material layer. When the positive electrode active material is included in an amount within the above range, excellent capacity characteristics may be obtained.

The conductive agent is used to provide conductivity to the electrode, wherein any conductive agent may be used without particular limitation as long as it has electron conductivity without causing chemical changes in a battery. Specific examples of the conductive agent may be graphite such as natural graphite or artificial graphite; carbon based materials such as carbon black, acetylene black, Ketjen black, channel black, furnace black, lamp black, thermal black, or carbon fibers; metal powder or metal fibers such as copper, nickel, aluminum, or silver; conductive whiskers such as zinc oxide or potassium titanate; conductive metal oxides such as titanium oxide; or conductive polymers such as polyphenylene derivatives, and any one thereof or a mixture of two or more thereof may be used. The conductive agent may be included in an amount of 0.1 wt % to 15 wt % with respect to the total weight of the positive electrode active material layer.

The binder serves to improve the adhesion between the positive electrode active material particles and the adhesion between the positive electrode active material and the current collector. Specific examples of the binder may be polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % with respect to the total weight of the positive electrode active material layer.

The positive electrode may be prepared according to a typical method of preparing a positive electrode, except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector.

The solvent may be a solvent generally used in the art and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Lithium Secondary Battery

In addition, an electrochemical device including the positive electrode may be prepared in the present invention. The electrochemical device may specifically be a battery or a capacitor, and, more specifically, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing chemical changes in a battery, and, for example, copper, stainless steel, aluminum, nickel, titanium, fired carbon, copper or stainless steel that is surface-treated with carbon, nickel, titanium, silver, etc., and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various forms such as a film, a sheet, a foil, a net, a porous body, a foam body, and a non-woven fabric body.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound that can be alloyed with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 to 99 parts by weight with respect to the total weight of the negative electrode active material layer.

The binder is a component that assists in the binding between the conductive agent, the active material, and the current collector, wherein the binder is typically added in an amount of 0.1 to 10 parts by weight with respect to the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a nitrile-butadiene rubber, a fluoro rubber, various copolymers thereof, etc.

The conductive agent is a component for further improving conductivity of the negative electrode active material, wherein the conductive agent may be added in an amount of 10 parts by weight or less, for example, 5 parts by weight or less with respect to the total weight of the negative electrode active material layer. The conductive agent is not particularly limited as long as it has conductivity without causing chemical changes in a battery, and, for example, graphite such as natural graphite or artificial graphite; carbon black such as acetylene black, Ketjen black, channel black, furnace black, lamp black, or thermal black; conductive fibers such as carbon fibers or metal fibers; metal powder such as fluorocarbon powder, aluminum powder, or nickel powder; conductive whiskers such as zinc oxide or potassium titanate; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

Meanwhile, in the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery.

Specifically, $LiPF_6$, $LiClO_4$, $LiAsF_6$, $LiBF4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 to 5 parts by weight with respect to the total weight of the electrolyte.

As described above, since the lithium secondary battery including the positive electrode active material according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

Nickel sulfate, cobalt sulfate, and manganese sulfate were dissolved in ion-exchanged water in an amount such that a molar ratio of nickel:cobalt:manganese was 90:4:6 to prepare an aqueous transition metal solution (2.4 M). In addition, a 9% aqueous ammonia solution and a 25% aqueous sodium hydroxide solution were prepared. The aqueous transition metal solution, the aqueous ammonia solution and the aqueous sodium hydroxide solution were added to the coprecipitation reactor at a constant rate, and the coprecipitation reaction was performed in a nitrogen atmosphere to synthesize a transition metal hydroxide precursor.

Thereafter, boric acid (2.1 g) was dissolved in water (150 mL), and then a transition metal hydroxide precursor (350 g) was added to the aqueous boric acid solution (150 mL), and stirred. The mixed solution was vacuum dried using a rotary evaporator, and the slurry mixture was dried at 100° C. for 5 hours or longer to prepare a transition metal hydroxide precursor.

The above-prepared transition metal hydroxide precursor and LiOH were mixed in a molar ratio of Me:Li of 1:1.02 and calcined at 810° C. for 11 hours to prepare a single-particle positive electrode active material having a crystallite size of 178 nm ($LiNi_{0.90}Co_{0.04}Mn_{0.06}B_{0.009}O_2$).

Example 2

A positive electrode active material and a lithium secondary battery including the same were prepared in the same manner as in Example 1, except that when mixing and calcining the transition metal hydroxide precursor prepared in Example 1 and LiOH, the calcination temperature was 830° C.

Example 3

A positive electrode active material and a lithium secondary battery including the same were prepared in the same manner as in Example 1, except that boric acid (1,000 ppm) was dry mixed with respect to the total weight of the positive electrode active material precursor prepared in Example 1, and then calcined at 830° C. to prepare a positive electrode active material ($LiNi_{0.89}Co_{0.04}Mn_{0.06}B_{0.009}O_2$).

Comparative Example 1

A positive electrode active material and a lithium secondary battery including the same were prepared in the same manner as in Example 1, except that in the preparation of a transition metal hydroxide precursor, boron was not doped.

Comparative Example 2

A positive electrode active material and a lithium secondary battery including the same were prepared in the same manner as in Example 2, except that in the preparation of a transition metal hydroxide precursor, boron was not doped.

Comparative Example 3

A positive electrode active material and a lithium secondary battery including the same were prepared in the same manner as in Example 2, except that the transition metal hydroxide precursor prepared in Comparative Example 1 and LiOH were mixed in a molar ratio of 1:1.02, and calcined at 730° C. for 11 hours to prepare and use a positive electrode active material in the form of secondary particles in which primary particles were aggregated ($LiNi_{0.90}Co_{0.04}Mn_{0.06}O_2$).

Comparative Example 4

A positive electrode active material and a lithium secondary battery including the same were prepared in the same manner as in Example 1, except that when mixing and calcining the transition metal hydroxide precursor prepared in Example 1 and LiOH, the calcination temperature was 730° C.

Figure 2:
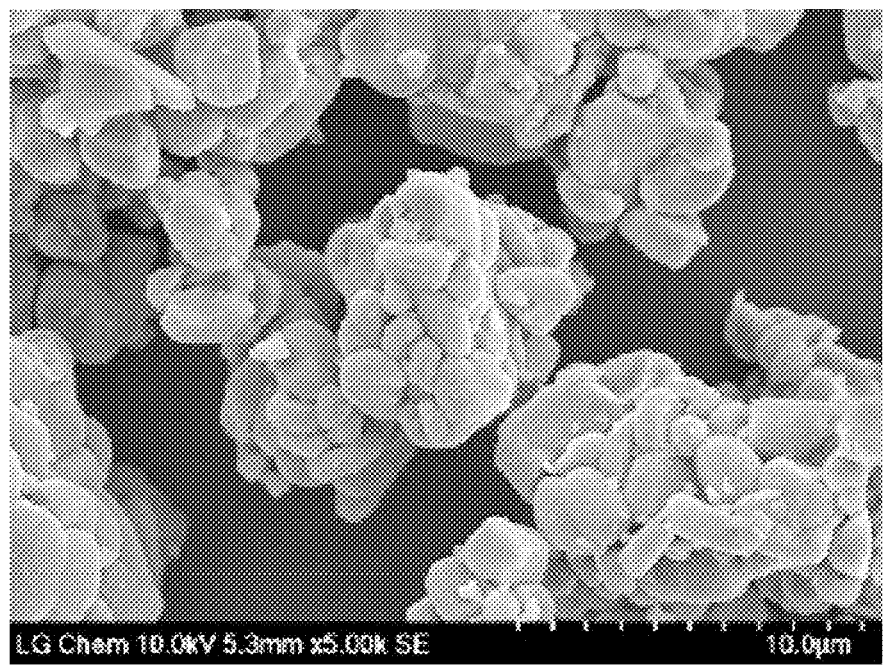
FIG. 2 is an SEM image of a positive electrode active material prepared in Comparative Example 1.
Figure 3:
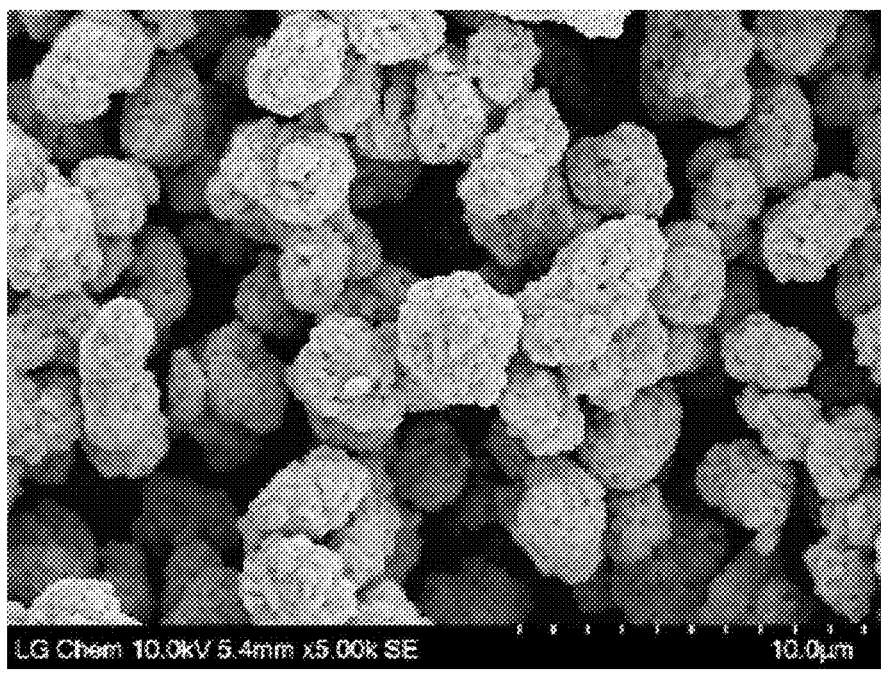
FIG. 3 is an SEM image of a positive electrode active material prepared in Comparative Example 3.

Experimental Example 1: Confirmation of the Characteristics of Positive Electrode Active Materials 1) SEM Image In order to confirm the surface characteristics of positive electrode active materials prepared in Examples 1, Comparative Examples 1 and 3, respectively, SEM images were examined using a scanning electron microscope. As shown in FIGS. 1 to 3, the positive electrode active materials prepared in Example 1 (FIG. 1) and Comparative Example 1 (FIG. 2) were confirmed to have a single particle form. On the other hand, the positive electrode active material prepared in Comparative Example 3 (FIG. 3) was confirmed to have a secondary particle form in which primary particles are aggregated.

2) Average Particle Diameter Measurement of Positive Electrode Active Materials

After disaggregating B-doped positive electrode active materials prepared in Examples 1 to 3 and Comparative Examples 1 to 4 using a simple mixer (HMF600, Hanil Mixer) for 4 minutes, a laser diffraction particle size measurement instrument (e.g., Microtrac MT 3000) was used to irradiate an ultrasonic wave of about 28 kHz at an output of 60 W, and then the average particle diameter ($D_{50}$) at 50% in a cumulative particle diameter distribution according to the particle diameter in the measurement instrument was calculated and shown in Table 1 below. In addition, the B-doped positive electrode active materials prepared in Examples 1 to 3 and Comparative Examples 1 to 4 were disaggregated and compressed by applying a pressure of 3 tons (3.1 to 3.2 g/cm$^3$), and then an average particle diameter ($D_{50}$) measured by the above-described method is also shown in Table 1 below.

3) Pellet Density of Positive Electrode Active Materials

For the pellet density of positive electrode active materials prepared in Examples 1 to 3 and Comparative Examples 1 to 4 respectively, an internal volume was measured at a pressure of 3.0 ton using a rolling density meter (4350, Carver). The volume inside the Sus was measured using a vernier calipers (Miltutoyo) for the internal volume, and the results are also shown in Table 1 below.

TABLE 1

| | Particle size after disaggregation ($D_{50}$) (μm) | Particle size after rolling ($D_{50}$) (μm) | Pallet density (g/cc) |
|---|---|---|---|
| Example 1 | 8.8 | 4.0 | 3.16 |
| Example 2 | 8.4 | 4.5 | 3.19 |
| Example 3 | 8.1 | 4.6 | 3.17 |
| Comparative Example 1 | 7.3 | 2.9 | 3.18 |
| Comparative Example 2 | 7.4 | 3.3 | 3.20 |
| Comparative Example 3 | 5.2 | Particle cracking | 2.85 |
| Comparative Example 4 | 5.9 | Particle cracking | 2.83 |

As shown in Table 1 above, in terms of positive electrode active materials prepared in Examples 1 to 3, it was confirmed that the average particle diameter ($D_{50}$) was maintained at 4 μm to 6 μm after rolling as the crystallite size increased. However, in terms of positive electrode active materials prepared in Comparative Examples 1 and 2, the crystal growth of the positive electrode active material particles by B doping was inferior to that of Examples, so that it was confirmed that the particle diameter after rolling was less than the range of the present invention. In addition, in terms of positive electrode active materials prepared in Comparative Examples 3 to 4, the calcination temperature was lower than the range of the present application, in this case it was confirmed that the positive electrode active material particles were broken when rolling at a rolling density of 3.1 g/cm³ to 3.2 g/cm³ regardless of B doping.

In addition, in terms of secondary batteries prepared in Examples 1 to 3, even when doped with B, it shows the same level of pellet density as compared with the case without B doping as in Comparative Examples 1 and 2. In addition, it was confirmed that positive electrode active materials of Examples 1 to 3 have superior pellet density to those of Comparative Examples 3 to 4 in the form of secondary particles in which primary particles are aggregated.

4) Crystallite Size of Positive Electrode Active Materials

In positive electrode active materials prepared in Examples 1 to 3 and Comparative Example 3, the X-ray diffractometer (Bruker AXS D4-Endeavor XRD) was used to measure crystallite size, and the results are shown in Table 2 below.

TABLE 2

| | Crystallite size (nm) |
|---|---|
| Example 1 | 178 |
| Example 2 | 189 |
| Example 3 | 208 |
| Comparative Example 3 | 100 |

As shown in Table 2, it was confirmed that the positive electrode active materials prepared in Examples 1 to 3 were in the form of a single particle having a crystallite size of 170 nm or more. Meanwhile, in Comparative Example 3, as the positive electrode active materials were prepared in the form of secondary particles in which primary particles are aggregated, the crystallite size was remarkably smaller than that of the present invention.

Experimental Example 2: Evaluation of Capacity Characteristics

Lithium secondary batteries were prepared using the positive electrode active materials prepared in Examples 1 and 2 and Comparative Examples 1 to 4, and the lithium secondary batteries including the positive electrode active materials of Examples 1 to 2 and Comparative Examples 1 to 4 each were evaluated.

Specifically, the positive electrode active materials prepared in Examples 1 and 2 and Comparative Examples 1 to 4, a carbon black conductive material, and the polyvinylidene fluoride (PVdF) binder were mixed in an N-methylpyrrolidone (NMP) solvent at a weight ratio of 96.5:1.5:2 to prepare a positive electrode slurry. The positive electrode slurry was applied to one surface of an aluminum current collector, dried at 100° C., and then rolled to prepare a positive electrode.

Meanwhile, lithium metal was used as a negative electrode.

An electrode assembly was prepared by interposing a porous polyethylene separator between the prepared positive electrode and the negative electrode, and then, the electrode assembly was placed in a battery case, and an electrolyte was injected into the case to prepare a lithium secondary battery. In this case, as an electrolyte, lithium hexafluorophosphate ($LiPF_6$, 1.0 M) was dissolved in an organic solvent in which ethylene carbonate:ethyl methyl carbonate: diethyl carbonate (EC:EMC:DEC) was mixed at a volume ratio of 3:4:3, and the electrolyte was injected to prepare lithium secondary batteries according to Examples 1 and 2 and Comparative Examples 1 to 4.

Each of the lithium secondary batteries according to Examples 1 to 2 and Comparative Examples 1 to 4 prepared above was charged with 0.05 C cut off up to 4.25 V at 0.2 C constant current at room temperature. Then, it discharged until it became 2.5V at 0.2 C constant current. The charging and discharging behavior was set to 1 cycle, and from the second round, charging with 0.05 C cut off to 4.25V at 0.5 C constant current and discharge to 2.5V at 0.5 C constant current were set to 1 cycle. After repeating such cycle 30 times, the capacity retention according to the cycles of the secondary batteries of Examples 1 to 2 and Comparative Examples 1 to 4 was measured, and the results are shown in Tables 3, 4, and 5 below.

TABLE 3

| | Initial discharge capacity (mAh/g) | Capacity retention @30 cycles (%) |
|---|---|---|
| Example 1 | 201.7 | 91.3 |
| Example 2 | 197.3 | 92.8 |
| Comparative Example 1 | 199.8 | 91.1 |
| Comparative Example 2 | 196.7 | 91.0 |
| Comparative Example 3 | 206.2 | 88.5 |
| Comparative Example 4 | 207.7 | 89.1 |

Figure 4:
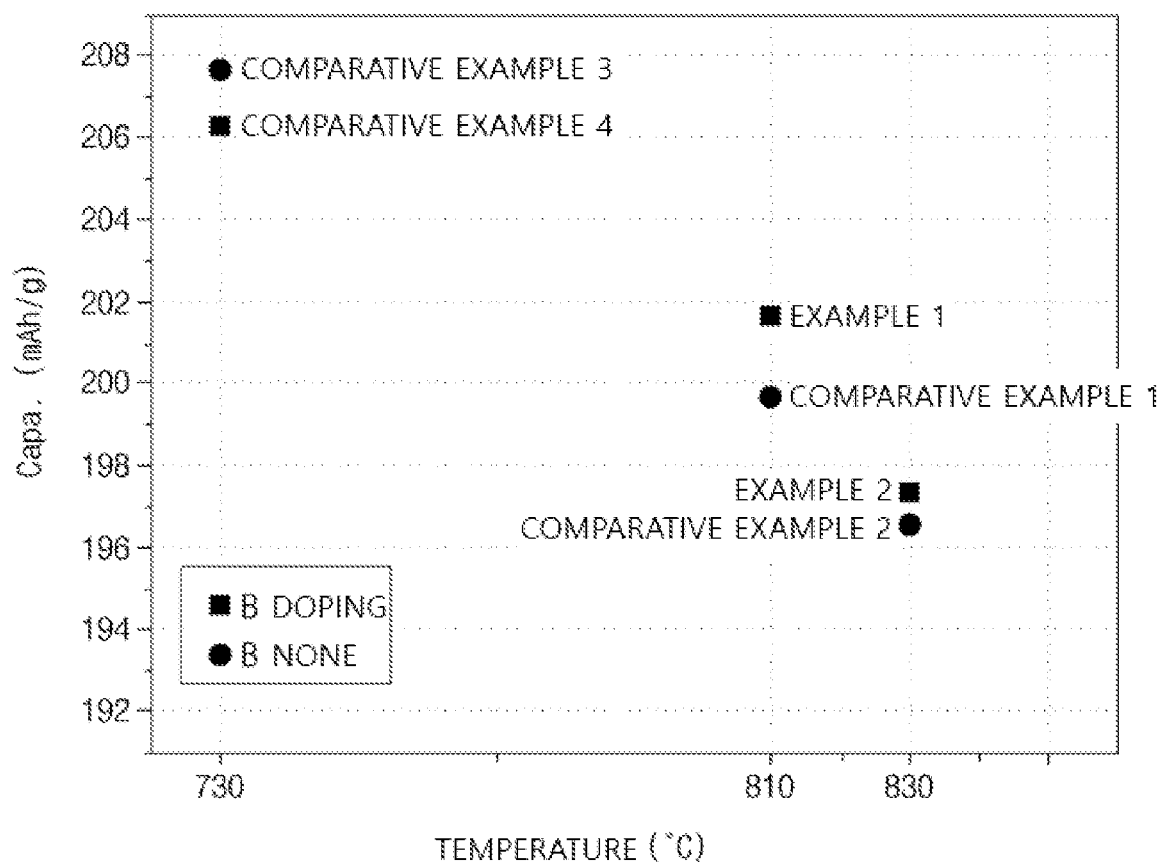
FIG. 4 is a graph showing capacity retention according to the presence or absence of B doping for each calcination temperature of lithium secondary batteries including positive electrode active materials prepared in Examples 1 to 2 and Comparative Examples 1 to 4.
Figure 5:
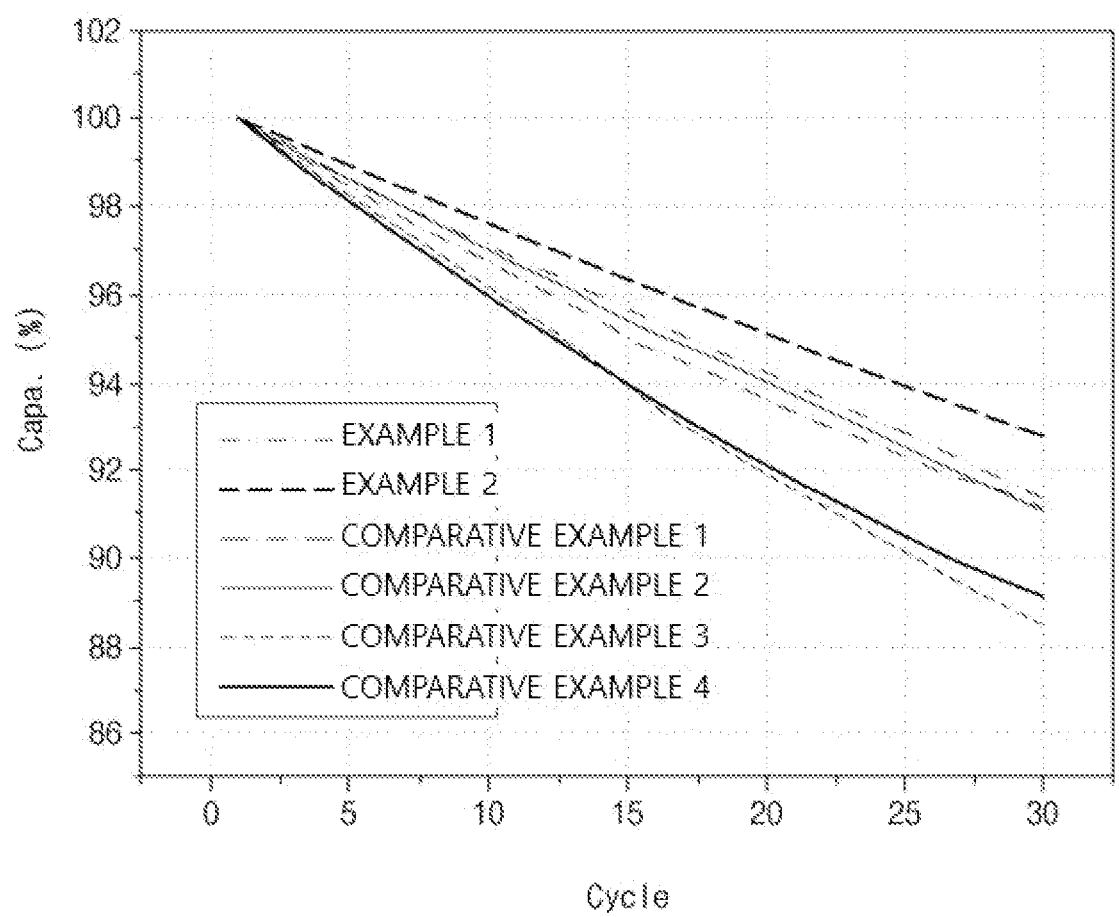
FIG. 5 is a graph showing capacity retention according to cycles of lithium secondary batteries including positive electrode active materials prepared in Examples 1 to 2 and Comparative Examples 1 to 4.

As shown in Table 3, FIG. 4 and FIG. 5, in terms of lithium secondary batteries including the positive electrode active materials of Example 1 and Comparative Example 1, Example 2 and Comparative Example 2, which were prepared under the same conditions but different in the presence or absence of B doping, it was confirmed that the initial discharge capacity of the secondary batteries prepared in Examples 1 and 2 in which B doping was performed, was higher than the initial discharge capacity of the secondary batteries prepared in Comparative Examples 1 and 2 in which B doping was not performed.

In addition, in terms of the secondary batteries prepared in Comparative Examples 3 to 4, the initial discharge capacity was excellent, but the structural stability was inferior to that of the secondary batteries prepared in Examples 1 to 2, so that the capacity retention was inferior in 30 cycles or more.

Experimental Example 3: Evaluation of Resistance Characteristics

The resistance characteristics of each of the lithium secondary batteries according to Examples 1 to 3 and Comparative Examples 1 and 2 prepared in Experimental Example 2 were evaluated.

Specifically, each of the lithium secondary batteries of Examples 1 to 3 and Comparative Examples 1 and 2 was charged with 0.05 C cut off up to 4.25V at 0.5 C constant current at room temperature. Then, it discharged until it became 2.5V at 0.5 C constant current. In this case, the voltage corresponding to 60 seconds was recorded, and the resistance was calculated by dividing the difference from the initial voltage by the applied current. The initial resistance of the secondary batteries according to Examples 1 to 3 and Comparative Examples 1 to 2 was measured, and the results are shown in Table 4 and FIG. 6.

TABLE 4

|  | Initial DCIR (%) |
| --- | --- |
| Example 1 | 25.2 |
| Example 2 | 33.7 |
| Example 3 | 39.0 |
| Comparative Example 1 | 41.6 |
| Comparative Example 2 | 61.8 |

Figure 6:
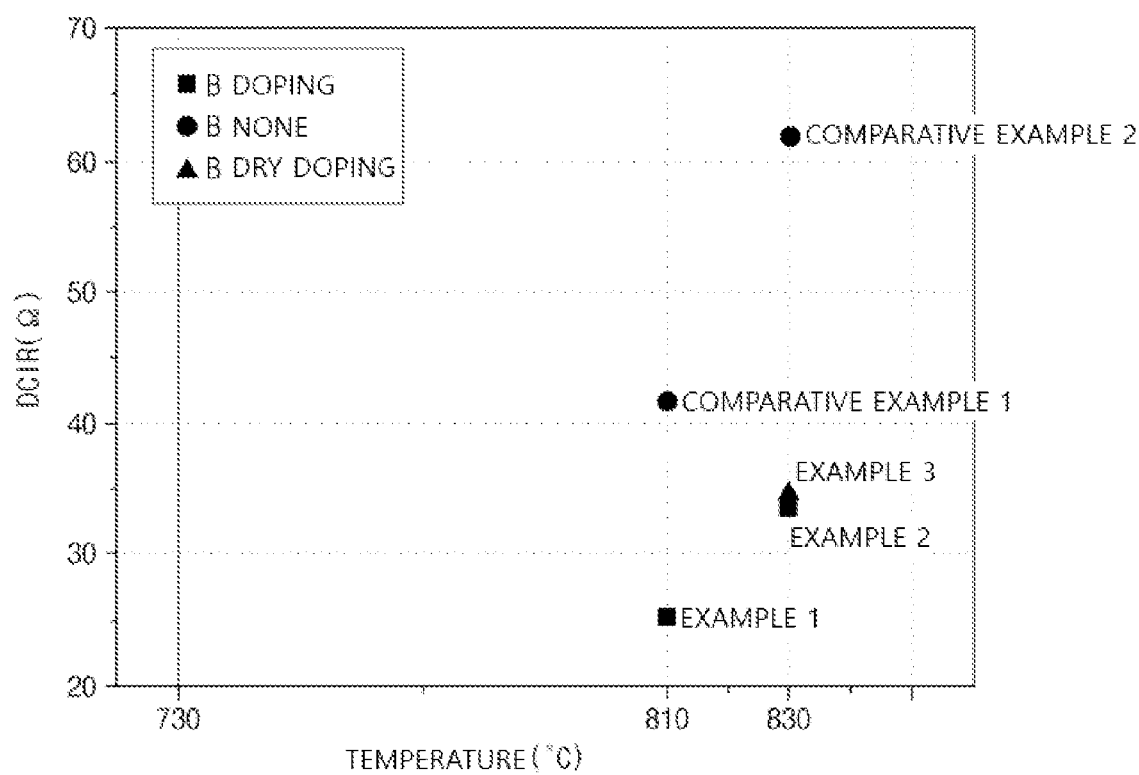
FIG. 6 is a graph showing resistance characteristics according to the presence or absence of B doping for each calcination temperature of lithium secondary batteries including positive electrode active materials prepared in Examples 1 to 3 and Comparative Examples 1 to 2.

As shown in Table 4 and FIG. 6, in terms of the initial resistance characteristics according to the present invention, it was confirmed that the secondary batteries to which the positive electrode active materials prepared in Examples 1 to 3 were applied were superior to the secondary batteries to which the positive electrode active materials prepared in Comparative Examples 1 to 2 were applied.

Experimental Example 4: Continuous Charging Test

Figure 7:
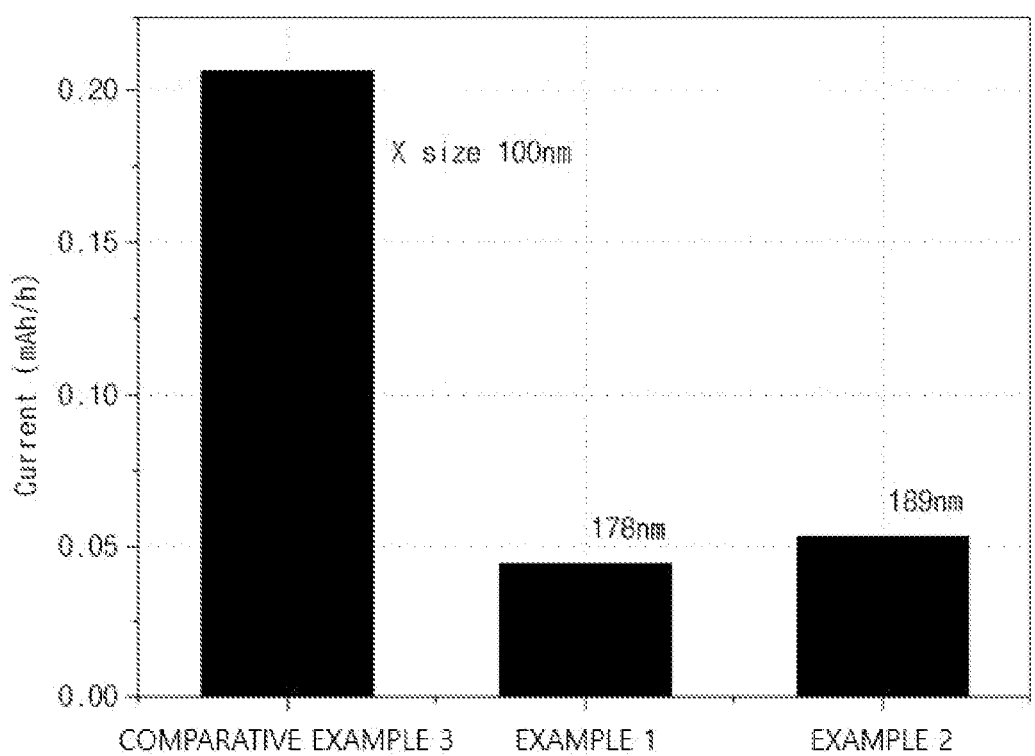
FIG. 7 is a graph showing continuous charging characteristics of lithium secondary batteries including positive electrode active materials prepared in Examples 1 and 2 and Comparative Example 3.

Each of the lithium secondary batteries according to Examples 1 and 2 and Comparative Example 3 prepared in Experimental Example 2 was charged for 120 hours to maintain 4.5V at 60° C., and the amount of current generated under the condition was measured and the results are shown in FIG. 7.

As shown in FIG. 7, in Comparative Example 3, it was confirmed that more current was generated during continuous charging than in Examples 1 and 2. In Comparative Example 3, since the stability of the positive electrode active materials was inferior to that of Examples 1 and 2, the amount of current generated by the side reaction between the surface of the positive electrode active material and the electrolyte was greater.

The invention claimed is:

1. A positive electrode active material comprising a lithium transition metal oxide including nickel (Ni), cobalt (Co), and manganese (Mn),
wherein
the positive electrode active material has an average particle diameter ($D_{50}$) of 4 μm to 10 μm after rolling at a rolling density of 3.0 g/cm$^3$ to 3.3 g/cm$^3$ and has a form of a single particle,
wherein a crystallite size of the lithium transition metal oxide is 170 nm to 200 nm, and
wherein the lithium transition metal oxide is represented by Formula 1 below:

$$Li_{1+a}Ni_xCo_yMn_zM^1{}_wO_2 \qquad \text{[Formula 1]}$$

wherein,
$0 \leq a \leq 0.5$, $0.8 \leq x < 1$, $0 < y \leq 0.2$, $0 < z \leq 0.2$, and $0 < w \leq 0.01$, and $M^1$ is B.

2. The positive electrode active material of claim 1, wherein a doping element is included in an amount of 100 ppm to 4,000 ppm with respect to a total weight of the lithium transition metal oxide.

3. A method of preparing the positive electrode active material according to claim 1, comprising:
preparing a transition metal hydroxide precursor containing 60 mol % or more of nickel with respect to a total number of moles of transition metal hydroxide containing nickel (Ni), cobalt (Co), and manganese (Mn);
mixing the transition metal hydroxide precursor with a doping element raw material-containing aqueous solution and drying to obtain a mixture, wherein the doping element raw material-containing aqueous solution includes; and
mixing a lithium raw material with the mixture and calcining at 810° C. or higher to prepare a lithium transition metal oxide in a form of a single particle.

4. The method of claim 3, wherein the doping element raw material comprises at least one selected from the group consisting of boric acid, boron trioxide, boron carbide, boron trifluoride, and boron monofluorine.

5. The method of claim 3, wherein the calcining is performed at 810° C. to 880° C.

6. A positive electrode for a lithium secondary battery comprising the positive electrode active material according to claim 1.

7. A lithium secondary battery comprising the positive electrode according to claim 6.

* * * * *